US010639946B2

United States Patent
Zaroor et al.

(10) Patent No.: US 10,639,946 B2
(45) Date of Patent: May 5, 2020

(54) SYSTEMS AND METHODS FOR MONITORING TIRE PRESSURE

(71) Applicant: Advantage Enterprises, Inc., Harrisonville, MO (US)

(72) Inventors: Phillip George Zaroor, Harrisonville, MO (US); Jason Phillip Zaroor, Harrisonville, MO (US); Vanessa Zaroor Hargrave, Harrisonville, MO (US); Edward Allen Lutsko, III, Peculiar, MO (US); Jeromy Abed Mogharbel, Kansas City, MO (US)

(73) Assignee: ADVANTAGE ENTERPRISES, INC., Harrisonville, MO (US)

( * ) Notice: Subject to any disclaimer, the term of this patent is extended or adjusted under 35 U.S.C. 154(b) by 0 days.

(21) Appl. No.: 16/213,356

(22) Filed: Dec. 7, 2018

(65) Prior Publication Data
US 2019/0105953 A1    Apr. 11, 2019

Related U.S. Application Data

(63) Continuation of application No. 15/138,181, filed on Apr. 25, 2016, now Pat. No. 10,150,339.
(Continued)

(51) Int. Cl.
*B60C 23/04* (2006.01)

(52) U.S. Cl.
CPC ...... *B60C 23/0479* (2013.01); *B60C 23/0474* (2013.01)

(58) Field of Classification Search
CPC .................. B60C 23/0474; B60C 23/0479
(Continued)

(56) References Cited

U.S. PATENT DOCUMENTS

| 4,067,235 A | 1/1978 | Markland et al. |
| 4,319,220 A | 3/1982 | Pappas et al. |

(Continued)

FOREIGN PATENT DOCUMENTS

| FR | 3014752 A1 * | 6/2015 | ......... B60C 23/0471 |
| WO | 2005049339 A2 | 6/2005 | |

OTHER PUBLICATIONS

"Non-Final office Action received for U.S. Appl. No. 15/138,181, dated Dec. 29, 2017." 22 pages.
(Continued)

*Primary Examiner* — Hirdepal Singh
(74) *Attorney, Agent, or Firm* — Kutak Rock LLP

(57) ABSTRACT

A tire pressure monitor system allows for customized configurations and a variety of intelligent alerts to increase usability and reliability over existing tire pressure monitor systems. A central receiver determines the alerts, rather than individual receivers, so that the tires can be monitored as a system rather than as individual tires. For instance, a Cross-Axle Alert is triggered when the pressure in a tire on one side of an axle is significantly greater than the pressure in a tire on an opposite side of the axle. Additional features include the use of Dynamic Reference Pressures, as opposed to static reference pressures, so that the alert parameters can be adjusted according to the current driving conditions. A robust user interface provides a user with a variety of views and screens and enables an administrator to adjust alert parameters while preventing a driver from adjusting the same parameters.

14 Claims, 4 Drawing Sheets

Related U.S. Application Data

(60) Provisional application No. 62/152,407, filed on Apr. 24, 2015.

(58) Field of Classification Search
USPC .......................................................... 340/447
See application file for complete search history.

(56) References Cited

U.S. PATENT DOCUMENTS

| | | | |
|---|---|---|---|
| 4,970,491 A | 11/1990 | Saint et al. | |
| 5,463,374 A | 10/1995 | Mendez et al. | |
| 5,517,853 A * | 5/1996 | Chamussy | B60C 23/0408 |
| | | | 340/442 |
| 5,581,023 A | 12/1996 | Handfield et al. | |
| 5,600,301 A | 2/1997 | Robinson, III | |
| 5,825,286 A | 10/1998 | Coulthard | |
| 6,259,361 B1 | 7/2001 | Robillard et al. | |
| 6,292,096 B1 | 9/2001 | Munch et al. | |
| 6,453,737 B2 | 9/2002 | Young et al. | |
| 9,694,631 B2 | 7/2017 | Tsuchikawa et al. | |
| 10,150,339 B2 | 12/2018 | Zaroor et al. | |
| 2005/0057348 A1 * | 3/2005 | Hammerschmidt | ....................... |
| | | | B60C 23/0408 |
| | | | 340/445 |
| 2009/0224900 A1 | 9/2009 | Shimura | |
| 2012/0001745 A1 | 1/2012 | Li | |
| 2012/0136591 A1 | 5/2012 | Lemense et al. | |
| 2014/0184403 A1 | 7/2014 | Kosugi et al. | |
| 2014/0245825 A1 | 9/2014 | McIntyre et al. | |
| 2014/0306815 A1 | 10/2014 | Henriet et al. | |
| 2014/0354420 A1 | 12/2014 | Terada et al. | |
| 2014/0354421 A1 | 12/2014 | Kosugi et al. | |
| 2015/0061852 A1 * | 3/2015 | Fu | B60C 23/0474 |
| | | | 340/442 |
| 2015/0321640 A1 | 11/2015 | Hisada | |
| 2016/0059646 A1 | 3/2016 | Cimponeriu | |
| 2016/0167446 A1 * | 6/2016 | Xu | G06F 16/2291 |
| | | | 702/34 |
| 2016/0200155 A1 | 7/2016 | Steinmeyer et al. | |
| 2016/0272017 A1 * | 9/2016 | Ghannam | B60T 7/12 |
| 2016/0311273 A1 | 10/2016 | Zaroor et al. | |
| 2017/0174193 A1 * | 6/2017 | Kirkpatrick | B60C 23/0408 |
| 2017/0326927 A1 | 11/2017 | Bill et al. | |

OTHER PUBLICATIONS

"Notice of Allowance received for U.S. Appl. No. 15/138,181, dated Aug. 3, 2018, 10 pages" 10 pages.

\* cited by examiner

SYSTEMS AND METHODS FOR MONITORING TIRE PRESSURE

CROSS-REFERENCE TO RELATED APPLICATIONS

This application is a continuation application of co-pending U.S. patent application Ser. No. 15/138,181, filed Apr. 25, 2016, now U.S. Pat. No. 10,150,339, which claims priority pursuant to 35 U.S.C. 119(e) to U.S. Provisional Patent Application Ser. No. 62/152,407, filed Apr. 24, 2015, the entire disclosures of which are incorporated herein by reference.

FIELD OF THE INVENTION

The present invention relates generally to the field of monitoring air/gas pressure in vehicle tires and other pressurized objects. More specifically, the present invention is concerned with automatically sensing tire pressure.

BACKGROUND OF THE INVENTION

Tire pressure sensors have long been used to sense the pressure of tires to indicate when the tire is below a predetermined tire pressure. These sensors use various means, typically diaphragms screwed into tire valve stems and responsive to tire pressure for activating an electrical switch for generating an alarm. Various types of tire monitoring systems have been used to provide continuous vehicle tire pressure sensing and monitoring during vehicular operation. Such systems typically include a monitor located in the passenger compartment of the vehicle for receiving encoded transmitted signals for respective tires and for alerting the vehicular operator through the use of audio alarms and graphic display indicators. The ability to selectively sense the pressure of each tire is desirable so that the subject tire can then be inflated to proper air pressure levels for safety and long tire wear life.

U.S. Pat. No. 6,453,737 (the '737 patent), the entire disclosure of which is incorporated herein by reference, teaches a particularly notable tire pressure sensory and monitoring system and method of use. The system includes a plurality of air pressure sensor modules and a monitor. Each air pressure sensor module is secured to a respective valve stem of a respective tire of a vehicle and is in data communication with the monitor. Together, the monitor and the tire pressure sensor modules alert a driver (by way of an alert light and/or an alert buzzer) in the event that a particular tire's pressure drops below a preprogrammed low tire air pressure trigger value. In this way, the system monitors individual tires and generates alerts based on a static trigger value.

Although the '737 patent teaches a superior tire pressure sensory and monitoring system and method of use compared to those of the prior art at the time, it would be beneficial if the system monitored each tire as part of a tire system and/or generated alerts based on dynamic trigger values. It would also be beneficial if the system prioritized alerts so that a driver could more readily ascertain the most critical alert so as to be better informed as to whether an alert required immediate attention or whether the driver could safely proceed under the current conditions. It would still further be beneficial if the system included a user interface and a password-protected administrative interface so that a driver could not change the alert conditions of the system. The present inventive concept provides these and other benefits not currently provided by systems and methods of the prior art.

SUMMARY OF THE INVENTION

The present inventive concept is directed to a vehicular tire pressure monitoring system that receives tire pressure signals from a plurality of tire pressure sensor modules. Each tire pressure sensor module is attached to the valve of a respective tire of a vehicle. In some embodiments, the tire pressure sensor module includes a motion detector switch that is activated when the vehicle is in motion through rotating tires that spin the sensors. Upon the detection of motion, battery power is routed to sensor electronics so that the sensor is powered during vehicular motion but remains dormant during periods of inactive vehicular motion so as to conserve sensor battery power.

The tire pressure monitoring system includes a receiver in wireless communication with the plurality of tire pressure sensor modules. Some embodiments of the receiver include a processor and a monitor in wired or wireless communication with the processor. In some such embodiments, the receiver further includes a database in wired or wireless communication with the processor such that data can be stored in the database and/or retrieved from the database. In some embodiments, the database stores trigger values and/or trigger conditions. In some such embodiments, the database also stores pressure values for each tire so that trigger values can be determined for each trigger condition. In this way, alarms are determined by the receiver, not by the sensors. In other embodiments, at least some of the alarms are determined by the sensors.

The tire pressure monitoring system further includes a user interface in wired or wireless communication with the processor. In some embodiments, the user interface is integrated with the processor, such as through implementation of physical buttons integrated into a casing of the receiver and/or through virtual buttons displayed on the monitor. In other embodiments, the user interface is implemented via an application running on a mobile device, such as a smart phone. In some such embodiments, a receiver, such as a Dongle, is configured to receive radio frequencies emitted from the plurality of tire pressure sensor modules and/or from the mobile device. In other such embodiments, the receiver is configured to emit radio frequencies, such as those commonly referred to as Bluetooth, so as to send data to the mobile device. In some such embodiments, the user interface is configured to provide alerts in the form of audio alarms and/or graphic display indicators. In other such embodiments, the receiver is configured to provide alerts. In still other such embodiments, the receiver provides an indication that an alert exists and the user interface provides detailed information pertaining to the alert. For example, in one embodiment, the receiver displays a red alert light when an alert exists.

Some embodiments of the present invention generate one or more alert based on information obtained from two or more tires ("Differential Alert"). In some such embodiments, the system provides a Differential Alert if a differential tire pressure is potentially detrimental to the safe and/or efficient operation of the vehicle. For instance, in some embodiments, adjacent tires (often referred to as a dually) may not load equally and/or may otherwise load improperly if the differential pressure is outside of an acceptable range. In other examples, handling of a vehicle, such as during braking, turning, and/or accelerating, may be compromised if differential tire pressure associated with tires positioned towards the front of the vehicle and the rear of the vehicle is outside of an acceptable range. As yet another example, some systems of the present invention provide an alert (a "Cross-Axle Alert") when a tire pressure value received from a first tire pressure sensor module falls outside of a range (a "Cross-Axle Allowable Range"). The Cross-Axle Allowable Range is determined by using a tire pressure value received from a second tire pressure sensor module. More specifically, a trigger condition (such as a pressure differential value and/or a pressure differential percentage) is applied to the tire pressure value received from the second tire pressure sensor module so as to determine the Cross-Axle Allowable Range for the first tire. In this way, the present invention is capable of looking at tires as a system, not just individually.

In some embodiments of a Cross-Axle Alert, the first tire pressure sensor module is associated with a first tire on a first side of an axle and the second tire pressure sensor module is associated with a second tire on a second side of the axle. In this way, the present invention is capable of comparing the tire pressure on one side of an axle with the tire pressure on the other side of the axle and alerting a driver if the differential between the tire pressures meets or exceeds a predetermined trigger condition. For instance, in some such embodiments, the predetermined trigger condition involves dividing the highest pressure on the axle by the lowest pressure on the axle and comparing the resulting percentage to a predetermined percentage threshold.

Some embodiments of the present invention provide an alert (a "Leak Alert") when a tire pressure falls below a trigger value (a "Leak Alert Trigger Value"). The Leak Alert Trigger Value is determined by using a tire pressure value previously measured for the tire. More specifically, a trigger condition (such as a pressure differential value and/or a pressure differential percentage) is applied to the tire pressure value that was previously measured so as to determine the Leak Alert Trigger Value for the first tire. In this way, the present invention is capable of looking at tires over time. For instance, in one such embodiment, the Leak Alert Trigger Value for a particular tire pressure value is equal to four psi less than a tire pressure value that was measured twelve seconds prior to receiving the particular tire pressure value. In other instances, the trigger value is equal to a percentage of a tire pressure value that was received a particular amount of time prior to receiving the particular tire pressure value.

Some embodiments of the present invention provide one or more alerts ("Dynamic Pressure Alerts") when a tire pressure falls below a trigger value (a "Dynamic Pressure Trigger Value"). In some such embodiments, Dynamic Pressure Trigger Values are determined using one or more tire pressure value previously recorded for the tire as a reference value ("Dynamic Reference Pressure"). In this way, the trigger values are not static. Instead, the trigger values adjust according to conditions.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention is directed to a tire pressure monitoring and alert system 10 and a method of monitoring tire pressure. In preferred embodiments, the system includes a receiver 20 in wireless communication with a plurality of tire pressure sensors.

Figure 1:
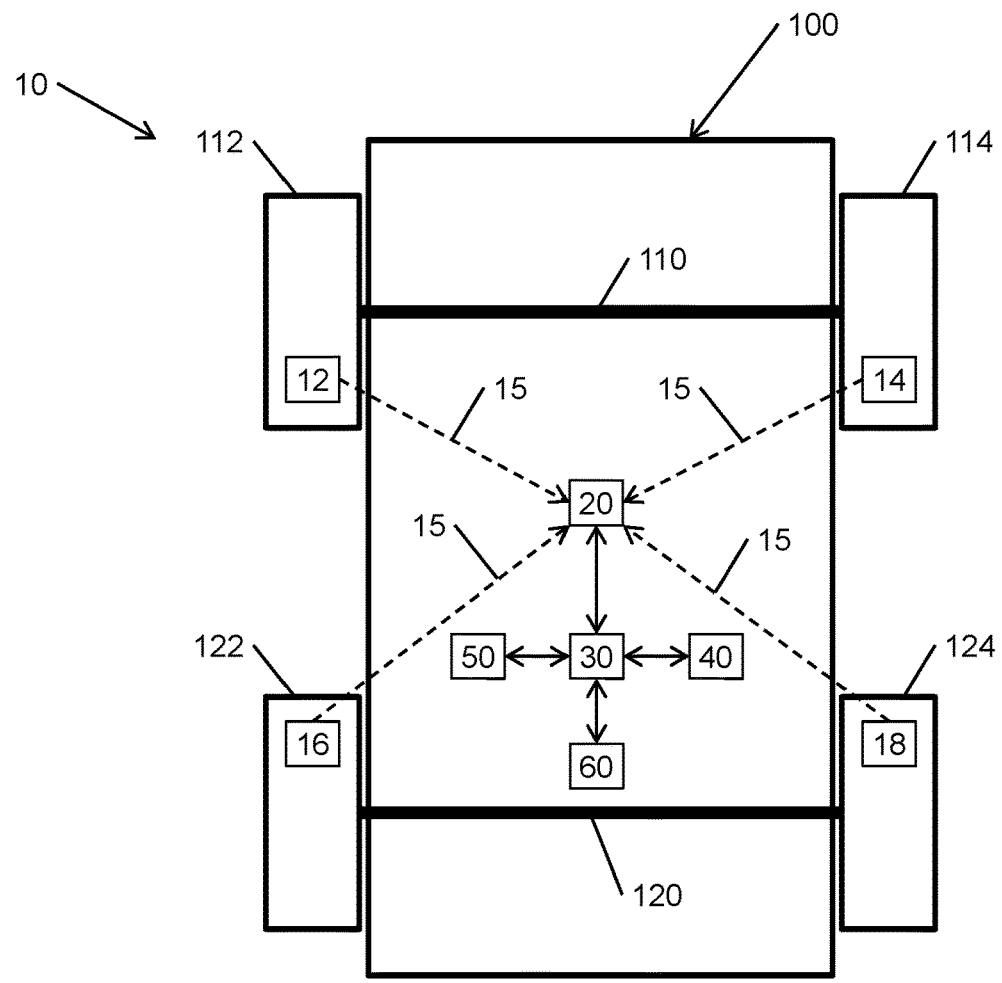
FIG. 1 is a plan view of a graphical representation of an embodiment of the system of the present invention being utilized with a two-axle vehicle.

Referring to FIG. 1, some embodiments of the present invention include first 12, second 14, third 16, and fourth 18 tire pressure sensors. In some embodiments, the first 12 and second 14 tire pressure sensors are associated with respective first 112 and second 114 tires of a vehicle 100. In some such embodiments, the first tire 112 is coupled to a first side of a first axle 110 of the vehicle 100 and the second tire 114 is coupled to a second side of the first axle 110.

Each tire pressure sensor is configured to measure a pressure of its respective tire and to emit a signal 15 associated with the measured pressure. The receiver 20 is configured to receive the signals 15. In some embodiments, the receiver is a remote receiver that is positioned within the vehicle but displaced from each tire.

In preferred embodiments, the system 10 further includes a processor 30 in data communication with the receiver 20. In some embodiments, the processor 30 is a component of the receiver 20. The processor is configured to process the signals so as to determine a value associated with the measured pressure value (a "Pressure Value").

In some embodiments, the Pressure Value is a value that is associated with a recently measured pressure value (a "Current Pressure Value"). In this way, a Current Pressure Value of a tire is associated with the current pressure of the respective tire. It will be appreciated that, at least in some embodiments, there is a small lag in time between the pressure of the tire being measured and the Current Pressure Value being determined. It will further be appreciated that even with the small lag in time, the Current Pressure Value of the tire is still considered to be associated with the current pressure of the tire.

Still referring to FIG. 1, some embodiments of the present invention further include a memory 40. In some embodiments, the memory 40 is in data communication with the processor 30 and/or the receiver 20. In some such embodiments, the memory is a component of the receiver 20 and/or the processor 30.

The memory 40 is configured to store information. In some embodiments, the processor 30 sends a Current Pressure Value to the memory 40 for storage prior to and/or after the processor determines a subsequent Current Pressure Value. In this way, the system is configured to store one or more historical Pressure Value (a "Previous Pressure Value") associated with each tire. In other embodiments, the memory stores information pertaining to one or more Trigger Value for each tire and/or one or more Allowable Range for each tire.

In some embodiments, a Trigger Value is a value associated with the pressure of a particular tire. In some such embodiments, the Trigger Value is a maximum value and the system is configured to generate a response, such as an alarm and/or a warning (an "Alert"), if the Current Pressure Value for a tire matches and/or exceeds the Trigger Value. In other such embodiments, the Trigger Value is a minimum value and the system is configured to generate an Alert if the Current Pressure Value for a tire matches and/or falls below the Trigger Value. In some embodiments, the memory 40 stores a different Trigger Value for each tire.

In some embodiments, an Allowable Range is a range of values associated with the pressure of a particular tire. In some such embodiments, the Allowable Range includes all values that are greater than a minimum Trigger Value. In other embodiments, the Allowable Range includes all values that are less than a maximum Trigger Value. In still other embodiments, an Allowable Range includes values within a range of pressure values, such as values between maximum and minimum Trigger Values.

In preferred embodiments, the processor causes the memory to replace one or more Trigger Value and/or one or more Allowable Range for one or more tire if one or more condition is met (a "Change Condition"). In some embodiments, the system of the present invention is configured to assess whether a Change Condition exists for one or more tire. In some such embodiments, the system is configured to change a Trigger Value and/or an Allowable Range during operation of the vehicle.

In preferred embodiments, the system is configured to compare the Current Pressure Value of one or more tire with one or more Previous Pressure Value of the one or more tire. In some embodiments, a Change Condition exists for one or more tire if a Current Pressure Value associated with the one or more tire is greater than the largest Previous Pressure Value currently stored for the particular tire. In other embodiments, a Change Condition exists for one or more tire if a Current Pressure Value associated with the one or more tire is less than the smallest Previous Pressure Value currently stored for the particular tire.

In some embodiments, each Previous Pressure Value is associated with a time. In some such embodiments, Previous Pressure Values are deleted and/or otherwise disregarded after a certain amount of time. In other embodiments, each Previous Pressure Value is associated with a sequential numbering system. In some such embodiments, Previous Pressure Values are deleted and/or otherwise disregarded after a certain number of subsequent Pressure Values have been obtained. In this way, the system is configured so as to be capable of deleting and/or otherwise disregarding a Previous Pressure Value after a certain amount of time by obtaining new Pressure Values in regular intervals.

Some embodiments of the present invention provide an Alert associated with differential tire pressures associated with a first tire in a first position relative to the vehicle and a second tire in a second position relative to the vehicle (a "Differential Alert"). In some such embodiments, the alert is associated with differential tire pressures of opposed first 112 and second 114 tires of an axle 110 of a vehicle 100 (a "Cross-Axle Alert"). In some embodiments, a Cross-Axle Alert is provided when a Current Pressure Value associated with a first tire 112 falls outside of an acceptable differential range (a "Cross-Axle Allowable Range"). In some such embodiments, the Current Pressure Value is equivalent to a pressure value of the first tire 112. In other such embodiments, the Current Pressure Value is equivalent to a ratio of the pressure values in the first 112 and second 114 tires (a "Differential Ratio" and/or a "Cross-Axle Ratio").

In some embodiments, the Cross-Axle Ratio is determined by dividing a value, such as a tire pressure value, associated with the pressure of the first tire 112 by a corresponding value associated with the second tire 114. In other embodiments, the Cross-Axle Ratio is determined by dividing a value associated with the second tire 114 by a corresponding value associated with the first tire 112. In still other embodiments, the Cross-Axle Ratio is determined by dividing the larger of a Current Pressure Value of the first 112 and second 114 tires by the smaller of the Current Pressure Value of the first 112 and second 114 tires.

In some embodiments, the Allowable Range is a Differential Ratio Range and/or a Cross-Axle Ratio Range. In some such embodiments, the Differential Ratio Range and/or the Cross-Axle Ratio Range is a predetermined value associated with an acceptable range of Differential Ratios for tires in respective positions of a vehicle and/or Cross-Axle Ratios for tires associated with opposed sides of an axle. In other embodiments, an Allowable Range for one or more tire is determined based on a value of one or more Previous Pressure Value associated with a respective tire.

Some embodiments of the present invention provide an Alert associated with relatively large decreases in the pressure of a tire over a relatively short period of time (a "Leak Alert"). In some embodiments, a Leak Alert is provided when a Current Pressure Value associated with a tire reaches and/or falls below a Trigger Value for that tire (a "Leak Alert Trigger Value"). In some such embodiments, the Current Pressure Value is equivalent to a pressure value of the respective tire. In other such embodiments, the Trigger Value is associated with a Previous Pressure Value for the respective tire. For instance, in some embodiments, the Trigger Value is a percentage of the Previous Pressure Value. In other embodiments, the Trigger Value is a set value less than the Previous Pressure Value. In some embodiments, the Trigger Value is determined based on a maximum Previous Pressure Value. In some such embodiments, Previous Pressure Values are deleted and/or otherwise disregarded after a predetermined period of time and/or after a predetermined number of subsequent Pressure Values are obtained.

Some embodiments of the present invention are configured to update, add, and/or replace one or more Trigger Value (a "Dynamic Pressure Trigger Value") during vehicle operation. In some such embodiments, the system is further configured to provide a corresponding Alert (a "Dynamic Pressure Alert"). In some embodiments, Dynamic Pressure Trigger Values are determined using one or more Previous Pressure Value and/or other reference value (a "Dynamic Reference Pressure"). In this way, the trigger values are not static. Instead, the trigger values adjust according to conditions.

In some embodiments, the Dynamic Pressure Trigger Value for each tire is stored in the tire pressure sensor module 12, 14 for the respective tire. In some such embodiments, an old Dynamic Pressure Trigger Value is replaced with a new Dynamic Pressure Trigger Value when a replacement condition occurs. In some embodiments, the replacement condition occurs when a set percentage of the highest pressure read by the sensor in the last five minutes differs from the current Dynamic Pressure Trigger Value. For instance, in some such embodiments, the Dynamic Pressure Trigger Value is initially set to 75% of an initial tire pressure of 100 psi when a sensor is installed on a cold tire. As the tire warms and pressure in the tire increases incrementally from 100 psi to 120 psi, the Dynamic Pressure Trigger Value is increased incrementally to 75% of each current pressure reading because each new pressure reading is the highest pressure read by the sensor in the last five minutes. In the event that the tire begins to cool and the pressure in the tire begins to decrease incrementally, the Dynamic Pressure Trigger Value will not be replaced until five minutes after it begins its incremental pressure decrease. After the initial five minutes, the Dynamic Pressure Trigger Value is decreased incrementally to 75% of the pressure reading taken 5 minutes prior to the current pressure reading because each new pressure reading is lower than the previous pressure reading.

Some embodiments of the present invention are configured to store one or more predetermined Trigger Value (a "Static Pressure Trigger Value") and/or a predetermined Allowable Range (a "Static Pressure Allowable Range"). In some such embodiments, the system is further configured to provide a corresponding Alert (a "Static Pressure Alerts"). In some embodiments, Static Pressure Trigger Values and/or Static Pressure Allowable Ranges are determined using a predetermined reference value (a "Static Reference Pressure"). In some such embodiments, Static Pressure Alerts are used in conjunction with Cross-Axle Alerts, Leak Alerts, and/or Dynamic Pressure Alerts. In some such embodiments, Static Pressure Trigger Values are lowered (or increased as the case may be) and/or Static Pressure allowable ranges are enlarged relative to similar systems that do not use Cross-Axle Alerts, Leak Alerts, and/or Dynamic Pressure Alerts. In this way, the present invention reduces and/or eliminates false alerts while providing substantially the same number of real alerts.

In some embodiments, the Static Pressure Trigger Value for each tire is stored in the tire pressure sensor module 12, 14 for the respective tire. In some such embodiments, the Static Pressure Trigger Value for a particular tire pressure sensor module is determined as a percentage of an initial pressure reading from a tire upon placing the tire pressure sensor module onto the tire. In other such embodiments, the Static Pressure Trigger Value is set by a user based on a preferred tire pressure range. In still other embodiments, the Static Pressure Trigger Value is actually a Dynamic Pressure Trigger Value that changes when a change condition occurs, such as when a tire pressure increases as the tire heats up or when a tire pressure decreases as the tire cools down.

Some embodiments of the present invention further include a centralized location for current alerts (an "Alert Screen"). In some embodiments, the Alert Screen displays an alert message that indicates the type of alert and/or the tire for which the alert pertains. In some such embodiments, the Alert Screen provides an indication of the total quantity of current alerts. In other such embodiments, alerts are prioritized by severity and the Alert Screen provides an indication of how a particular current alert is prioritized relative to the other current alerts. For instance, in some such embodiments having three total current alerts including a Static Pressure Alert, a Leak Alert, and a Cross-Axle Alert, the Static Pressure Alert is prioritized as the most critical current alert, the Leak Alert is prioritized as the second most critical current alert, and the Cross-Axle alert is prioritized as the least critical current alert. In some embodiments, the Alert Screen also includes previous alerts.

Some embodiments of the present invention include a monitor 50 for receiving and displaying information. In some embodiments, the monitor 50 is in data communication with the processor 30, the receiver 20, and/or the memory 40. In other embodiments, a display of the monitor 50 is controlled by an ambient light algorithm for eliminating undue flickering and/or to create a smooth transition between displays.

In some embodiments, the Alert Screen is selectively displayed on the monitor 50. In some such embodiments, a Unit View, a Tire View, and an Axle View are also selectively displayed on the monitor. When the Unit View is selected, the monitor displays a graphical representation of a vehicle showing each tire that was programmed into the system, including an indication of each tire's location relative to the vehicle. When the Tire View is selected, the monitor 50 displays pressure and/or temperature values that are associated with a particular tire. When the Axle View is selected, the monitor displays pressure and/or temperature values that are associated with each tire that is associated with a particular axle. In some embodiments of the Unit View, the Tire View, and/or the Axle View, the monitor displays a vehicle tire layout, a selected unit, and/or an Alert Notification, if an Alert Notification exists.

In some embodiments, the system includes a password-protected administrative interface that enables an administrator to change one or more settings. For instance, in some such embodiments, the system includes default settings for each alert. In such an embodiment, the password-protected administrative interface enables an administrator with access to the password to customize the settings as desired while preventing a user without access to the password from changing the settings. In this way, a supervisor can ensure that a driver will not tamper with the system settings so as to create and/or eliminate a particular alert. In some such embodiments, the system records how long a driver continued to drive after receiving a particular alert prior to resolving the cause of the alert. In this way, the system enables a supervisor to review a driver's compliance with instructions and/or guidelines pertaining to a particular alert.

In some embodiments, the system includes one or more user interface 60 in data communication with the receiver 20, the processor 30, the memory 40, and/or the monitor 50. In some such embodiments, the user interface 60 of the present invention allows for a variety of configurations. In some such embodiments the user interface enables a driver and/or an administrator to align and/or re-align units and/or to customize vehicle layouts. In some such embodiments, a first vehicle layout includes ten tires associated with a tractor truck, a second vehicle layout includes the same layout as the first vehicle layout plus two tires associated with a first tractor trailer (12 total tires), and a third vehicle layout includes the same layout as the second vehicle layout plus four tires associated with a second tractor trailer (16 total tires). In some such embodiments, the monitor displays the vehicles with the first tractor trailer being aligned behind the tractor truck and the second tractor trailer being aligned behind the first tractor truck. In other such embodiments, the tractor trailers are re-aligned such that the monitor displays the second tractor trailer as being aligned behind the tractor truck and the first tractor trailer as being aligned behind the second tractor trailer. In some embodiments, the present invention facilitates vehicle re-alignment by detecting hook-up events (such as when one or more tractor trailer is hooked-up to one or more tractor truck) and prompting a user to re-arrange the units on a user display, such as a monitor. In this way, a driver and/or administrator is able to customize vehicle layouts and/or unit alignments regardless of whether the present invention can automatically and correctly order the trailers on the user display.

Some embodiments of the present invention further include a gateway device in data communication with a plurality of tire pressure sensor modules and a vehicle's on-board network. In some such embodiments, the gateway device receives data from up to sixteen tire pressure sensor modules. In this way, the present invention is capable of providing information to the vehicle's on-board network for up to sixteen tires.

Other embodiments of the present invention further include a plurality of repeater devices, each repeater device being in data communication with a plurality of tire pressure sensor modules and a gateway device. In some such embodiments, the gateway device is in data communication with a plurality of tire pressure sensor modules and a vehicle's on-board network. In some such embodiments, the gateway device receives data directly from up to sixteen tire pressure sensor modules and indirectly from additional tire pressure modules through repeater devices. In some such embodiments, the gateway device receives data from up to nine repeater devices and each repeater device receives data from up to sixteen tire pressure sensor modules. In this way, the present invention is capable of providing information to the vehicle's on-board network for up to 160 tires.

Other embodiments of the present invention further include tire pressure sensor modules that include gaskets positioned relative to a pressure sensor so as to create a seal between the pressure sensor and the source of the pressurized air being sensed. In this way, any cracks in an outer casing of the pressure sensor module will be isolated from the source of the pressurized air so that the crack will not create a leak path. In some such embodiments, the pressure sensor is incorporated into an integrated circuit and the gasket is configured to encompass the integrated circuit. In some such embodiments, the gasket is a quadrilateral gasket.

In a preferred embodiment of the present invention, Leak Alert Trigger Values are configurable parameters on a receiver while Dynamic Alert Trigger Values and a Static Alert Trigger Values are determined by a tire pressure sensor. More specifically, a tire pressure sensor sets a Static Reference Pressure ("SRP") and a Dynamic Reference Pressure ("DRP") by sensing the pressure of a tire upon being installed onto a valve stem of the tire. For instance, if the pressure of the tire is 100 psi, both the SRP and the DRP will be equal to 100 psi. In some such embodiments, the SRP will continue to be equal to 100 psi until the tire pressure sensor is removed from the valve stem and the DRP will continue to be equal to 100 psi until the occurrence of a DRP change event, such as a change in tire pressure. For instance, if the tire pressure increases to a pressure that is higher than the current DRP value, the DRP will be updated so that a new DRP value will be equal to the higher tire pressure. In another instance, if the highest tire pressure read in a pre-determined amount of time is lower than the current DRP value, the DRP value will be updated so that a new DRP value will be equal to the highest tire pressure read during the pre-determined time period. In some embodiments, the pre-determined time period is equal to 5 minutes.

In some embodiments of the present invention the tire pressure sensor determines one or more Alarm Trigger Values based on the SRP and the DRP. In some such embodiments, the one or more Alarm Trigger Values are based on a percentage of the SRP and/or the DRP. For instance, in some such embodiments, a High Pressure SRP Threshold Value is equal to 135% of the SRP value, a Low Pressure SRP Threshold Value is equal to 65% of the SRP value, and a Low Pressure DRP Threshold Value is equal to 91% of the DRP value. In such an embodiment, the tire pressure sensor emits an alarm transmission if the tire pressure exceeds the High Pressure SRP Threshold Value or falls below the Low Pressure SRP Value or the Low Pressure DRP Value.

In a specific example of the above described embodiment, an SRP of 100 psi is established for a tire pressure sensor when the tire pressure sensor is installed onto a valve stem of a tire that has 100 psi of pressure. The tire pressure sensor then determines that a High Pressure SRP Value is equal to 135 psi and that a Low Pressure SRP Value is equal to 65 psi. Consequently, the tire pressure sensor emits an alarm transmission if the tire pressure exceeds 135 psi or if the tire pressure falls below 65 psi.

In the same example as described above, an initial DRP value of 100 psi is established for a tire pressure sensor when the tire pressure sensor is installed onto the valve stem of the tire that has 100 psi of pressure. The tire pressure sensor then determines that a Low Pressure DRP Value is equal to 91 psi. Consequently, the tire pressure sensor emits an alarm transmission if the tire pressure falls below 91 psi unless the DRP Value is reduced to a value that is less than 100 psi (thereby reducing the Low Pressure DRP Value to a value that is less than 91 psi) prior to the tire pressure falling below 91 psi. In other words, the tire pressure sensor will only emit an alarm transmission related to the Low Pressure DRP Value if the tire pressure falls below the then current Low Pressure DRP Value.

In some embodiments of the example described above, the DRP value is equal to the highest tire pressure read during the 5 minutes that immediately precede the time of the current tire pressure reading being taken. Consequently, if the tire pressure increases to 120 psi, the DRP Value will increase to 120 psi and will remain at 120 psi until a higher tire pressure is read or until 5 minutes after the last pressure reading of 120 psi was taken. And although the SRP Value, the High Pressure SRP Value, and the Low Pressure SRP Value will remain at 100 psi, 135 psi, and 65 psi, respectively, the Low Pressure DRP Value will increase to 111 psi in correlation with the DRP Value increasing to 120 psi. Consequently, if the tire pressure falls below 111 psi within 5 minutes of the tire pressure sensor reading a maximum tire pressure of 120 psi, the tire pressure sensor will emit an alarm transmission related to the Low Pressure DRP Value.

In the same embodiments of the example described above, if the tire pressure decreases to 66 psi and remains at or below 66 psi for 5 minutes, the DRP Value will decrease to 66 psi and will remain at 66 psi until a higher tire pressure is read or until 5 minutes after the last pressure reading of 66 psi was taken. And although the SRP Value, the High Pressure SRP Value, and the Low Pressure SRP Value will still remain at 100 psi, 135 psi, and 65 psi, respectively, the Low Pressure DRP Value will decrease to 60 psi in correlation with the passage of 5 minutes after the DRP Value decreasing to 66 psi. Consequently, if the tire pressure falls below 60 psi within 5 minutes of the tire pressure sensor reading a maximum tire pressure of 60 psi, the tire pressure sensor will emit an alarm transmission related to the Low Pressure DRP Value.

Figure 2:
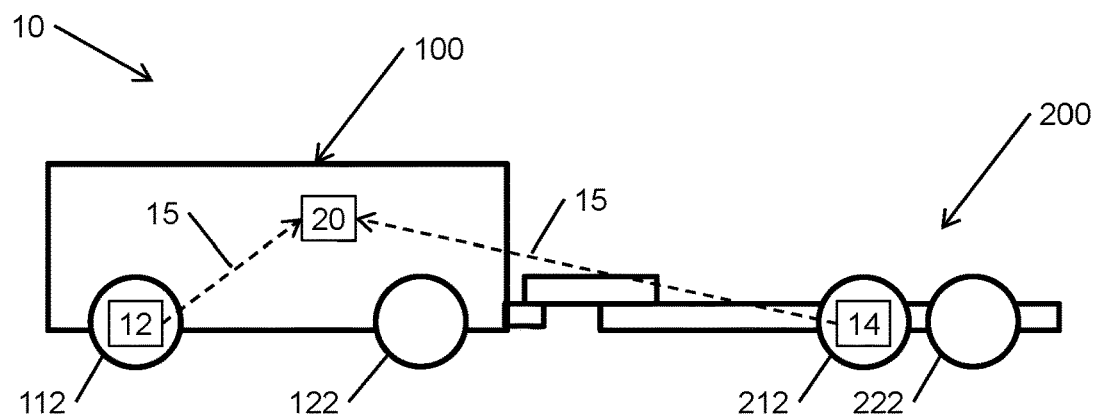
FIG. 2 is a side view of a graphical representation of an embodiment of the system of the present invention being utilized with first and second vehicles, the second vehicle being towed by the first vehicle.
Figure 3:
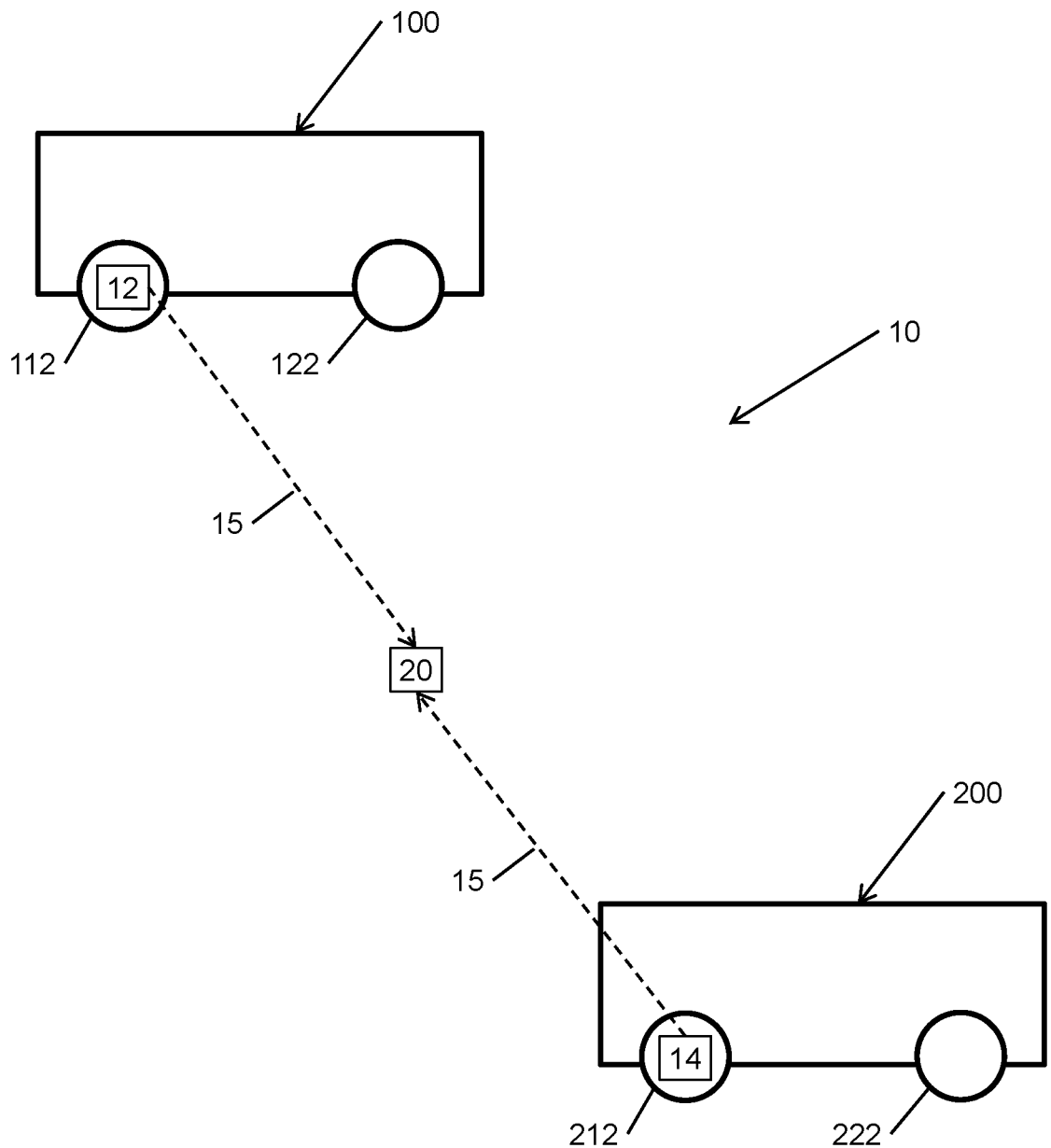
FIG. 3 is a graphical representation of an embodiment of a system of the present invention being utilized with first and second vehicles, each vehicle being independent of the other vehicle.

Referring to FIGS. 2 and 3, some embodiments of the present invention include associating tire pressure sensors with two or more vehicles. For instance, in one such embodiment, a first tire pressure sensor 12 is associated with at least one tire 112, 122 of a first vehicle 100 and a second tire pressure sensor 14 is associated with at least one tire 212, 222 of a second vehicle 200. In some such embodiments, such as shown in FIG. 3, each of the first 100 and second 200 vehicles is an independent self-powered vehicle. In other such embodiments, such as shown in FIG. 2, the first vehicle 100 is a self-powered vehicle, such as a tractor truck, and the second vehicle 200 is configured to selectively couple to the first vehicle 100 so as to be towed by the first vehicle 100. In some such embodiments, the first 100 or second 200 vehicle includes a receiver 20 for receiving signals 15 from the first 12 and second 14 tire pressure modules.

Figure 4:
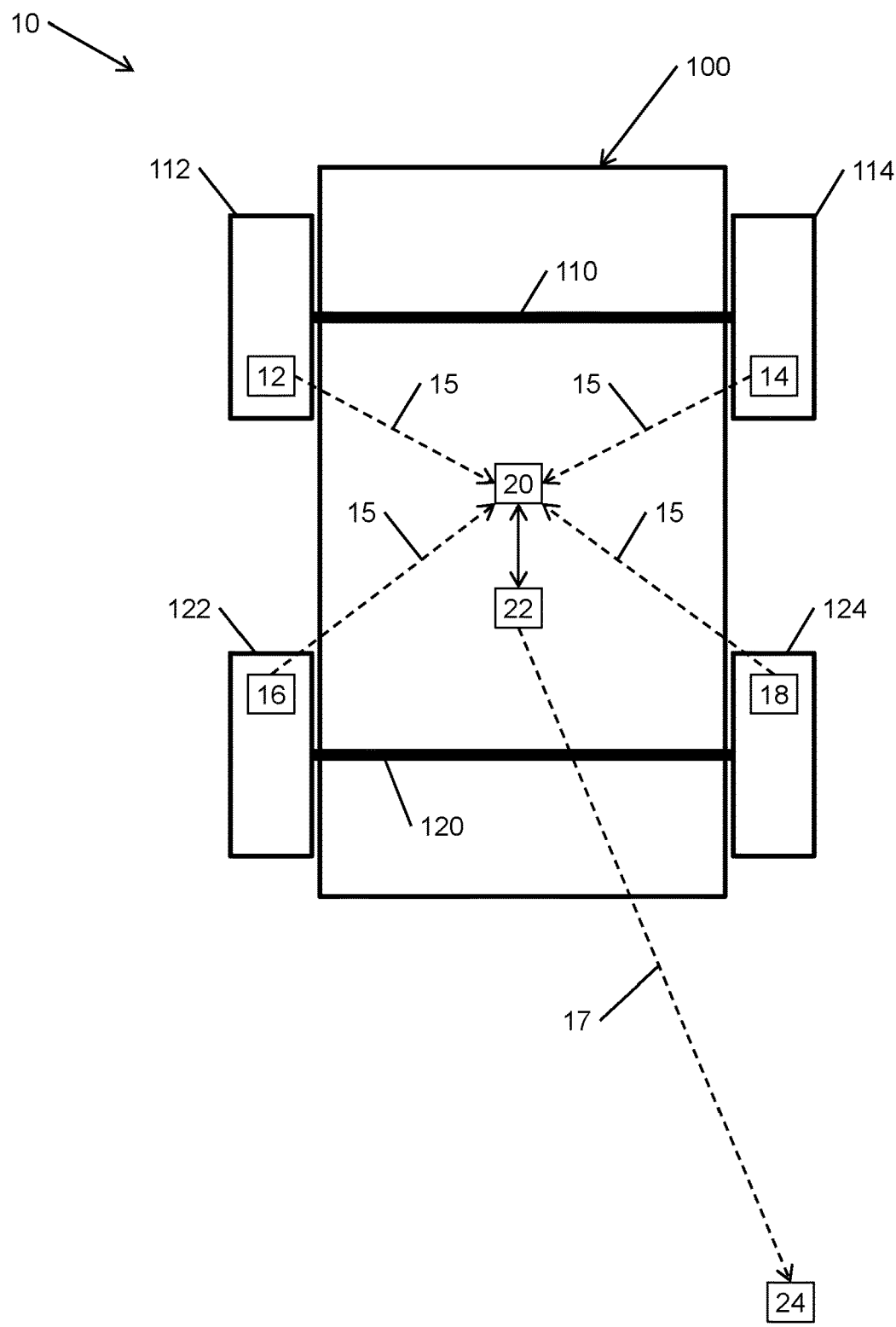
FIG. 4 is a graphical representation of an embodiment of the system of the present invention being utilized with a two-axle vehicle.

In some embodiments, the receiver 20 is a remote receiver that is positioned within the vehicle so that a driver and/or passenger of the vehicle can monitor tire pressure and/or be alerted of potential tire pressure issues. In other embodiments, such as shown in FIG. 4, the receiver 20 is a remote receiver that is positioned away from the vehicle, such as at a dispatch center, a racetrack pit, and/or other location, so that a user of the system can monitor tire pressure of tires of one or more remote vehicle.

Figure 5:
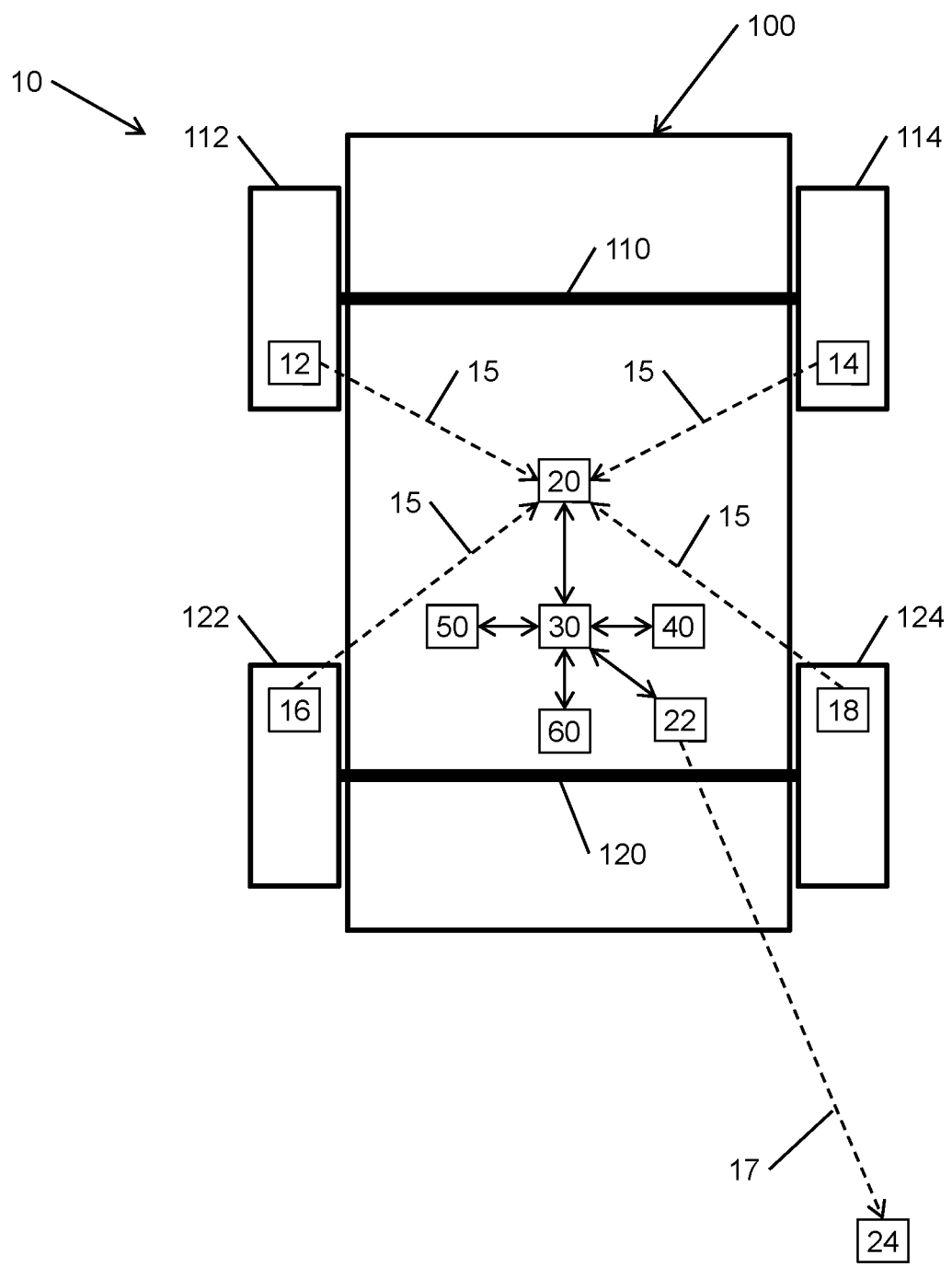
FIG. 5 is a graphical representation of an embodiment of the system of the present invention being utilized with a two-axle vehicle.

Referring to FIG. 5, some embodiments of the present invention include a transmitter 22 in data communication with the receiver 20. In some such embodiments, the transmitter 22 is configured to emit a signal 17. In some embodiments, the signal is a short-range signal that is capable of being received by a local receiving device 24, such as a personal electronic device. In other embodiments, the signal is a long-range signal that is capable of being received by a remote receiver, such as a cellular and/or radio tower.

The present invention also includes a method of monitoring tire pressure. In some embodiments, the method includes associating a plurality of tire pressure sensors 12, 14, 16, 18 with a plurality of tires 112, 114, 122, 124 of one or more vehicle. In some such embodiments, the method further includes receiving by a remote receiver device 20 a signal 15 from each of the tire pressure sensors. In some embodiments, the method includes processing the received signals so as to determine a Current Pressure Value and/or an Alert for each tire. In some such embodiments, each Current Pressure Value is associated with a current pressure of its respective tire. In other embodiments, the method includes storing information in the tire pressure sensors and/or the receiver pertaining to a Trigger Value and/or an Allowable Range for each tire. In some such embodiments, the Allowable Range is calculated based on the value of a Trigger Value. In other such embodiments, the Allowable Range and/or the Trigger Value is determined based on one or more Previous Pressure Value.

In some embodiments, the method of the present invention further includes updating, replacing, and/or adding a Target Value and/or an Allowable Range upon the occurrence of a Change Condition. In some such embodiments, such Change Condition occurs during operation of the vehicle. In other embodiments, the method further includes comparing each Current Pressure Value with a respective Allowable Range. In some such embodiments, an Alert is generated if the Current Pressure Value is outside of the respective Allowable Range. In still other embodiments, the method further includes emitting a signal 17 from a transmitter 22 of the present invention so as to communicate information pertaining to the pressure of tires of a vehicle, such as any alerts and/or warnings associated with the tire pressure. In some such embodiments, the method further includes receiving, by a receiving device the signal 17 so as to enable a local user of the system to receive the information on a personal electronic device and/or for a remote user to receive the information.

In some embodiments, tire pressure modules send signals to a receiver in regular intervals during normal operation. In some such embodiments, the intervals are relatively long (such as several minutes). In some embodiments, long intervals preserve battery life of the modules. In other such embodiments, the tire pressure modules take readings more frequently than they send signals. In some embodiments, the frequency of readings is determined based on logic that is utilized to determine risk of a potential Alert. For instance, in some embodiments, relatively constant readings lead to less frequent readings. In other embodiments, readings approaching one or more Trigger Value lead to more frequent readings. In some embodiments, a signal is sent by a tire pressure module upon the tire pressure module determining that an Alert condition exists. In some such embodiments, such a system enables the tire pressure modules to send signals less frequently when an Alert condition does not exist.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A tire pressure monitoring and alert system for a vehicle, the system comprising:
   a first tire pressure sensor for measuring pressure in a first tire of the vehicle;
   a processor in data communication with the first tire pressure sensor, the processor being configured to determine a Current Pressure Value for the first tire, the Current Pressure Value being associated with the current pressure of the first tire; and
   a memory in data communication with the processor, the memory being configured to store information pertaining to a Dynamic Pressure Trigger Value for the first tire, wherein the memory is configured to store at least one Dynamic Reference Pressure,
   wherein the Dynamic Pressure Trigger Value is determined based on a value of the Dynamic Reference Pressure, the Dynamic Reference Pressure being associated with a Previous Pressure Value of the first tire, the Previous Pressure Value having previously been a Current Pressure Value,
   wherein the system is configured to change the Dynamic Reference Pressure upon the occurrence of a change event, and
   wherein the change event occurs when a highest Previous Pressure Value associated with a pre-determined amount of time is different from the Dynamic Reference Pressure.

2. The system of claim 1, wherein the system is configured to compare the Current Pressure Value with the Dynamic Pressure Trigger Value, the system being configured to generate an Alert when the Current Pressure Value is less than the Dynamic Pressure Trigger Value.

3. The system of claim 1, wherein changing the Dynamic Reference Pressure comprises replacing the Dynamic Reference Pressure with the highest Previous Pressure Value associated with the pre-determined amount of time.

4. The system of claim 3, wherein:
   the memory is configured to store information pertaining to a Static Allowable Range for the first tire;
   the system is configured to generate an Alert when the Current Pressure Value for the first tire is outside of the Static Allowable Range for the first tire; and
   the Static Allowable Range is determined based on an Initial Pressure Value, the Initial Pressure Value being associated with the pressure in the first tire when the first tire sensor was installed onto the first tire.

5. The system of claim 4, wherein an initial Dynamic Reference Pressure is equal to the Initial Pressure Value.

6. The system of claim 5, wherein the system is configured so as to prevent a driver of the vehicle from altering at least one of the Dynamic Trigger Value, the Static Allowable Range, and the Current Pressure Value.

7. The system of claim 1, wherein:
   the first tire pressure sensor is configured to emit on regular intervals a signal associated with the Current Pressure Value; and
   the system is configured to generate an Alert when the Current Pressure Value is less than the Dynamic Pressure Trigger Value.

8. A method of monitoring tire pressure, the method comprising:
   associating a first tire pressure sensor with a first tire of a vehicle, the first tire pressure sensor being configured to measure pressure in the first tire of the vehicle;
   determining a Current Pressure Value for the first tire, the Current Pressure Value being associated with a current pressure of the first tire;
   storing information pertaining to a Dynamic Pressure Trigger Value for the first tire;
   storing at least one Dynamic Reference Pressure; and
   changing a value of the Dynamic Reference Pressure upon the occurrence of a change event,
   wherein the Dynamic Pressure Trigger Value is determined based on the value of the Dynamic Reference Pressure, the Dynamic Reference Pressure being associated with a Previous Pressure Value of the first tire, the Previous Pressure Value having previously been a Current Pressure Value, and
   wherein the change event occurs when a highest Previous Pressure Value associated with a pre-determined amount of time is different from the Dynamic Reference Pressure.

9. The method of claim 8, wherein changing the value of the Dynamic Reference Pressure comprises replacing the Dynamic Reference Pressure with the highest Previous Pressure Value associated with the pre-determined amount of time.

10. The method of claim 9, further comprising:
    storing information pertaining to a Static Allowable Range for the first tire;
    generating an Alert when the Current Pressure Value for the first tire is outside of the Static Allowable Range for the first tire; and
    generating an Alert when the Current Pressure Value is less than the Dynamic Pressure Trigger Value,
    wherein the Static Allowable Range is determined based on an Initial Pressure Value, the Initial Pressure Value being associated with the pressure in the first tire when the first tire sensor was installed onto the first tire.

11. The method of claim 10, further comprising establishing an initial Dynamic Reference Pressure upon the first tire sensor being installed onto the first tire, the initial Dynamic Reference Pressure being equal to the Initial Pressure Value.

12. The method of claim 11, further comprising preventing a driver of the vehicle from altering at least one of the Dynamic Trigger Value, the Static Allowable Range, and the Current Pressure Value.

13. A method for alerting a driver of a vehicle of a potential issue associated with a first tire of the vehicle, the method comprising:
    associating a first tire pressure sensor with the first tire, the first tire pressure sensor being configured to measure pressure in the first tire;
    determining a Current Pressure Value for the first tire, the Current Pressure Value being associated with a current pressure of the first tire while the vehicle is being driven by the driver;
    determining whether to generate an Alert, the determination comprising comparing the Current Pressure Value to a Dynamic Pressure Trigger Value and a Static Allowable Range;
    preventing the driver from altering at least one of the Dynamic Trigger Value, the Static Allowable Range, and the Current Pressure Value;

storing a Dynamic Reference Pressure, the Dynamic Pressure Trigger Value being determined based on a value of the Dynamic Reference Pressure, the Dynamic Reference Pressure being equal to a Previous Pressure Value of the first tire, the Previous Pressure Value having previously been a Current Pressure Value; and changing the value of the Dynamic Reference Pressure upon the occurrence of a change event, wherein the change event occurs when a highest Previous Pressure Value associated with a pre-determined amount of time is different from the Dynamic Reference Pressure, and wherein changing the value of the Dynamic Reference Pressure comprises replacing the Dynamic Reference Pressure with the highest Previous Pressure Value associated with the pre-determined amount of time.

14. The method of claim 13, further comprising storing information pertaining to a Static Allowable Range for the first tire, wherein:

the Static Allowable Range is determined based on an Initial Pressure Value, the Initial Pressure Value being associated with the pressure in the first tire when the first tire sensor was installed onto the first tire;

an Alert is generated when the Current Pressure Value for the first tire is outside of the Static Allowable Range for the first tire; and an Alert is generated when the Current Pressure Value is less than the Dynamic Pressure Trigger Value.

* * * * *